(12) United States Patent
Ruan et al.

(10) Patent No.: US 11,021,094 B2
(45) Date of Patent: Jun. 1, 2021

(54) MAGNETIC STRAP HOOK

(71) Applicant: ZHEJIANG TOPSUN LOGISTIC CONTROL CO. LTD, Zhejiang (CN)

(72) Inventors: Buqin Ruan, Zhejiang (CN); Zhaoyin Xiao, Zhejiang (CN)

(73) Assignee: ZheJiang TOPSUN Logistic Control Co., Ltd., Taizhou (CN)

( * ) Notice: Subject to any disclaimer, the term of this patent is extended or adjusted under 35 U.S.C. 154(b) by 0 days.

(21) Appl. No.: 16/607,723

(22) PCT Filed: May 10, 2018

(86) PCT No.: PCT/CN2018/086230
§ 371 (c)(1),
(2) Date: Oct. 24, 2019

(87) PCT Pub. No.: WO2019/200633
PCT Pub. Date: Oct. 24, 2019

(65) Prior Publication Data
US 2020/0055439 A1    Feb. 20, 2020

(30) Foreign Application Priority Data

Apr. 20, 2018    (CN) .......................... 201810361175.3

(51) Int. Cl.
*B60P 7/08*        (2006.01)
*B60P 3/00*        (2006.01)
(Continued)

(52) U.S. Cl.
CPC .............. *B60P 7/0823* (2013.01); *B60P 3/00* (2013.01); *B60J 7/104* (2013.01); *B60R 21/06* (2013.01); *F16B 45/00* (2013.01); *F21V 21/096* (2013.01)

(58) Field of Classification Search
CPC .... B60P 3/07; B60P 3/079; B60P 7/00; B60P 7/06; B60P 7/08; B60P 7/0807;
(Continued)

(56) References Cited

U.S. PATENT DOCUMENTS

| | | | |
|---|---|---|---|
| 2005/0286986 A1* | 12/2005 | Thomson ................... | B60P 7/15 410/117 |
| 2007/0099469 A1* | 5/2007 | Sorensen ................... | A45F 5/02 439/289 |
| 2007/0120392 A1* | 5/2007 | Wolfinger ............... | F16B 45/00 296/100.17 |

(Continued)

FOREIGN PATENT DOCUMENTS

| | | |
|---|---|---|
| CN | 201086676 Y | 7/2008 |
| CN | 201484827 U | 5/2010 |

(Continued)

OTHER PUBLICATIONS

International Search Report of PCT/CN2018/086230.

*Primary Examiner* — Hilary L Gutman
(74) *Attorney, Agent, or Firm* — Minder Law Group; Willy H. Wong

(57) ABSTRACT

The present invention provides a magnetic strap hook belonging to the technical field of logistics appliances. The present invention solves the problem that unhooking is easy to occur during usage of the magnetic strap hook in the prior art because the magnet is fixed on the hook body. The magnetic strap hook comprises a hook body, a magnet holder fixed on the hook body, and a magnet connected on the magnet holder. The hook body comprises a connector portion, and a hook portion connected to the connector portion and located at a front side of the connector portion. The magnet on the magnet holder is capable of moving back and forth relative to the hook body and/or swinging along front and rear directions of the hook body. The magnetic strap hook has the advantage of better stability of attraction of the strap hook during the process of binding goods.

12 Claims, 16 Drawing Sheets

(51) Int. Cl.
*B60J 7/10* (2006.01)
*B60R 21/06* (2006.01)
*F16B 45/00* (2006.01)
*F21V 21/096* (2006.01)

(58) Field of Classification Search
CPC ........ B60P 7/0823; F16B 45/00; B61D 45/00; F16G 11/00
USPC .......................................................... 410/117
See application file for complete search history.

(56) References Cited

U.S. PATENT DOCUMENTS

| | | | |
|---|---|---|---|
| 2009/0041557 A1* | 2/2009 | Lin .................. | B61D 45/00 410/97 |
| 2012/0227678 A1* | 9/2012 | Milani .................. | A01K 1/04 119/712 |
| 2013/0305497 A1* | 11/2013 | Coman .................. | B62D 27/06 24/303 |
| 2020/0240448 A1* | 7/2020 | Vadon .................. | F16B 1/00 |

FOREIGN PATENT DOCUMENTS

| | | | | |
|---|---|---|---|---|
| CN | 106539472 A | | 3/2017 | |
| CN | 206261408 U | | 6/2017 | |
| FR | 2764355 A1 | * | 12/1998 | ............ B60P 7/0823 |
| GB | 2560151 A | * | 9/2018 | ............ B60P 7/0823 |
| JP | 2007085450 A | * | 4/2007 | |
| WO | WO-2010134002 A1 | * | 11/2010 | ............ F21V 21/008 |
| WO | WO2013064149 A1 | | 5/2013 | |
| WO | WO-2019020998 A1 | * | 1/2019 | ............ B60P 7/0823 |

* cited by examiner

MAGNETIC STRAP HOOK

RELATED APPLICATIONS

This application is a national stage entry of International Application No. PCT/CN2018/086230 filed May 10, 2018, and claims benefit of Chinese Patent Application No. CN201810361175.3 filed Apr. 20, 2018.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention belongs to the technical field of logistics appliances and relates to a magnetic strap hook.

Related Art

In the process of transporting goods, in order to tie up and position goods, a binder is required. The binder typically comprises a tightening member, a binding strap, and a strap hook connected to one end of the binding strap. The strap hook structure generally comprises a connector portion connected to the binding strap, and a hook-shaped hook portion connected to a front side of the connector portion. The hook portion is capable of hook-connecting to the body of a truck during use. The strap hooks mainly used in the market are non-magnetic strap hooks, that is, the strap hooks are not magnetic and thus the strap hooks are incapable of attracting the truck body. When such a binder is used for binding by only one person alone, since a worker's hand cannot always hold onto the strap hook, when the hand separates from the strap hook and operates the tightening member to tighten the binding strap on another side of the truck body, with the strap hook being incapable of staying put on the truck body, it is easy for the strap hook to fall off, resulting in the failure of binding.

In order to solve the above problems of the conventional strap hooks, people have developed magnetic strap hook to solve the problem that the conventional strap hooks fall off easily during the binding process. The existing magnetic strap hooks have a variety of types and styles. However, the magnet on the existing magnetic strap hooks is fixed on the hook body. For example, the Chinese patent document discloses a puller hook positioning structure (authorized publication number: CN201086676Y), the positioning structure is mainly designed for maintaining the hooked relationship between a hook body attached to an end portion of a puller strap and a metal shelf of a vehicle body. A magnetic holder is attached to a position of the puller strap near the hook body, and the magnetic holder is provided with a magnetic device with strong attraction force opposite to an inner edge surface of a hooking side of the hook body. With the magnet being fixed on the hook body, the strap hook can be attracted by the vehicle body during the binding process of goods, and therefore to a certain extent, the strap hook is prevented from falling off. However, the strap hook still has a big problem, in the process of binding the goods by tightening a binding strap, the binding strap will inevitably swing. Since the strap hook is connected with the binding strap, the swinging binding strap will generate acting force on the strap hook, causing the hook body to tilt easily. Since the magnet of the strap hook is fixed on the hook body, the magnet also tilts when the hook body is tilted, resulting in a decrease in the attraction area of the magnet or even falling off of the magnet. Thus, the strap hook still has the drawback of detaching easily.

SUMMARY OF THE INVENTION

One object of one embodiment of the present invention is to solve the above problems in the prior art by providing a magnetic strap hook. The technical problem to be solved by the present invention is how to improve the stability of attraction of the strap hook during the process of binding goods.

One object of one embodiment of the present invention can be achieved by the following technical solutions: a magnetic strap hook comprising a hook body, a magnet holder fixed on the hook body, and a magnet connected on the magnet holder, the hook body comprising a connector portion, and a hook portion connected to the connector portion and located at a front side of the connector portion, wherein the magnet on the magnet holder is capable of moving back and forth relative to the hook body and/or swinging along front and rear directions of the hook body.

When in use, one embodiment of the strap hook is hook-connected to a vehicle body, and the magnet is attracted by the vehicle body to fix the strap hook. The magnet of the magnetic strap hook is capable of moving back and forth or swinging on the hook body, or is capable of moving back and forth and swinging on the hook body. With such a structural design, the hook body of the strap hook is movable relative to the magnet when the magnet is attracted by the vehicle body. Therefore, when a binding strap swings, back and forth movement or swinging of the hook body relative to the magnet can greatly reduce the influence of swinging of the binding strap on the attraction efficiency of the magnet, and keep the magnet stationary while the binding strap and the hook body swing, thereby more effectively avoiding the phenomenon of the magnet being tilted, so that the magnet can be more effectively attracted by the vehicle body, and the stability of attraction of the strap hook is improved.

In one embodiment of the above-mentioned magnetic strap hook, a slide cavity is disposed on the magnet holder, the magnet is slidably disposed in the slide cavity along the front and rear directions of the hook body, the magnet is capable of extending outside the slide cavity, and a gap is between a side wall of the slide cavity and the magnet. A limit structure is disposed on the magnet holder, and the limit structure is capable of limiting the distance the magnet can slide outward from the slide cavity. The side wall of the slide cavity refers to a side wall that guides the sliding of the magnet. During use, the strap hook is hook-connected on the vehicle body, and when the magnet approaches the vehicle body, the magnet is capable of automatically extending outside the slide cavity and attracting the vehicle body under the action of the attraction force. Since the magnet is slidably disposed in the slide cavity, and the gap is between the side wall of the slide cavity and the magnet, when the magnet is attracted by the vehicle body, the hook body is capable of swinging and being extended and retracted relative to the magnet. In addition, with clearance fit between the side wall of the slide cavity and the magnet, a large extent of swing of the hook body relative to the magnet can be avoided. The limit structure is capable of limiting the distance the magnet can slide outward from the slide cavity, thereby preventing a large extent of extending and retracting motion of the hook body relative to the magnet, and preventing the hook body from swinging excessively to cause unhooking under the premise of ensured stable attraction of the magnet.

In one embodiment of the above-mentioned magnetic strap hook, an opening is disposed on a front side of the magnet holder, the magnet is located in the opening, and a gap is between an inner peripheral surface of the opening and an outer peripheral surface of the magnet. Since the magnet is located in the opening, the magnet does not interfere with the magnet holder, ensuring that the magnet is capable of smoothly extending and retracting each time. At the same time, the gap between the inner peripheral surface of the opening and the outer peripheral surface of the magnet ensures that the magnet is also capable of swinging to a certain extent relative to the opening.

In one embodiment of the above-mentioned magnetic strap hook, a rear side of the magnet holder is provided with a press hole communicating with the slide cavity. By disposing the press hole, the magnet can be assisted manually to extend outward and attracted by the vehicle body, which makes the operation more convenient.

In one embodiment of the above-mentioned magnetic strap hook, the magnet comprises a main body in a circular block shape and located in the opening, an outer peripheral wall of the main body has a protruded guiding rim, the guiding rim is slidably connected in the slide cavity, and a gap is between the side wall of the slide cavity and the guiding rim. The gap between the guiding rim and the side wall of the slide cavity ensures that the magnet is capable of swinging to a certain extent in the slide cavity, thereby improving the stability of attraction of the strap hook.

In one embodiment of the above-mentioned magnetic strap hook, the slide cavity has a circular cross section, the opening is a circular opening, and a diameter of the main body is smaller than a diameter of the opening by 1 mm to 3 mm. The diameter of the opening is larger than the diameter of the main body of the magnet causing the magnet capable of swinging to a certain extent in the opening to improve the stability of attraction of the strap hook. The diameter of the main body of the magnet being smaller than the diameter of the opening by 1 mm to 3 mm, which not only ensures that the swing extent satisfies the requirement for stability of attraction, but also blocks external metal impurities from entering the slide cavity through the gap. The external metal impurities are only attracted by an outer end surface of the magnet which is easy to clean, so that the cleanness in the slide cavity can be ensured, and stably sliding and swinging of the magnet can also be ensured, thereby ensuring the stability of attraction of the strap hook.

In one embodiment of the above-mentioned magnetic strap hook, inside the slide cavity is further disposed with a slide plate, one side of the slide plate is opposite to the press hole, the magnet is located on another side of the slide plate and is connected to the slide plate, and a gap is between an outer peripheral surface of the slide plate and the side wall of the slide cavity. The gap between the outer peripheral surface of the slide plate and the side wall of the slide cavity ensures that the slide plate and the magnet are capable of swinging to a certain extent in the slide cavity, thereby improving the stability of attraction of the strap hook. By disposing the slide plate between the press hole and the magnet, on one hand, the slide plate can provide guiding effect to cause the magnet to extend and retract stably. On the other hand, since there is a large amount of metal impurities in the environment where the magnetic strap hook is being used, and the magnet is magnetic, the magnetism of the magnet is blocked by disposing the slide plate, so that the magnet does not actively attract the external metal impurities into the slide cavity, ensuring the slide plate capable of sliding and swinging stably in the slide cavity.

In one embodiment of the above-mentioned magnetic strap hook, the slide cavity has a circular cross section, the slide plate has a circular plate shape, and a diameter of the slide cavity is larger than a diameter of the slide plate. The slide cavity and the slide plate are circular, so that the hook body is also capable of rotating relative to the magnet, thereby reducing the influence on the attraction efficiency of the magnet when the hook body rotates, and improving the stability of attraction efficiency of the magnet.

In one embodiment of the above-mentioned magnetic strap hook, the hook body is formed by bending a metal strip, a middle portion of the metal strip is coplanarly bent to form the triangular connector portion, end portions at two ends of the metal strip are adjoined side by side and bent to form the hook portion, and the magnet holder is fixedly disposed inside the connector portion. By disposing the magnet holder inside the connector portion, the attraction effect is better, and the stability of attraction of the strap hook can be improved.

In one embodiment of the above-mentioned magnetic strap hook, the magnet holder comprises a rear cover and a front cover, the rear cover has a first circular cavity, the front cover is provided with a second circular cavity, and a diameter of the first circular cavity is the same as a diameter of the second circular cavity. The rear cover and the front cover match and cover each other, and the first circular cavity and the second circular cavity are opposite to each other to form the slide cavity. The press hole is provided on a bottom wall of the first circular cavity, and the opening is provided on a bottom wall of the second circular cavity. The rear cover and the front cover are connected by rivets, such disposition is convenient for installation, and is convenient for mass production.

In one embodiment of the above-mentioned magnetic strap hook, the guiding rim is annular and is disposed along a circumferential direction of the main body, and the gap between the side wall of the slide cavity and the guiding rim is larger than a gap between the inner peripheral surface of the opening and the main body. Since a cavity wall of the slide cavity cannot be made absolutely smooth, especially when the magnet holder is formed by connecting the front cover and the rear cover of the split structure, a concave-convex surface may be formed at a joint of the front cover and the rear cover due to the processing precision. At this time, the gap between the side wall of the slide cavity and the guiding rim is larger than the gap between the inner peripheral surface of the opening and the main body, so that the magnet does not contact an inner wall of the slide cavity or only contacts with a small area of the inner wall of the slide cavity during the sliding out process of the magnet, ensuring that the magnet is capable of smoothly extending and retracting in the slide cavity, which is beneficial to improve the stability of attraction of the magnet.

In one embodiment of the above-mentioned magnetic strap hook, the limit structure comprises an annular flange located on a side wall of an outer end of the second circular cavity, and the guiding rim or an edge of the slide plate is capable of butting against an inner end surface of the annular flange. By disposing the annular flange, the magnet can be prevented from sliding completely outside of the slide cavity, and, at the same time, during usage, although the magnet is stably attracted by the vehicle body, the hook body can be prevented from moving to a large extent to cause unhooking.

In one embodiment of the above-mentioned magnetic strap hook, the magnet holder has an extension rod having a cylindrical shape and extending along the front and rear directions of the hook body. A middle portion of the magnet is provided with a slide hole, and the magnet is slidably sleeved on the extension rod through the slide hole. A front end of the extension rod has a bulge head capable of preventing the magnet from detaching the extension rod, and a diameter of the slide hole is greater than or equal to a diameter of the extension rod. An end surface of a front end of the magnet is an attraction surface, and through sliding of the magnet the attraction surface is capable of sliding to reach a front side of the bulge head. When the diameter of the slide hole is larger than the diameter of the extension rod, the magnet is capable of sliding back and forth on the extension rod, and is also capable of realizing swinging. When the diameter of the slide hole is equal to the diameter of the extension rod, the magnet is capable of sliding back and forth on the extension rod, so when the binding strap swings, the hook body swings and moves back and forth relative to the magnet to cause the magnet capable of being more effectively attracted by the vehicle body.

In one embodiment of the above-mentioned magnetic strap hook, the magnet is hingedly connected on the magnet holder. Through such a design, the magnet is capable of swinging relative to the hook body, and when the binding strap swings, the magnet is capable of being more effectively attracted by the vehicle body.

In one embodiment of the above-mentioned magnetic strap hook, the magnet holder is disposed on the hook portion.

Compared with the prior art, one embodiment of the magnetic strap hook has the following advantages:

1. Since the magnetic strap hook is provided with the slide cavity in the hook body, when the magnet is attracted by the vehicle body, the hook body is capable of swinging and being extended and retracted relative to the magnet. When the binding strap swings, the hook body swings and extends and retracts relative to the magnet to cause the magnet capable of being more effectively attracted by the vehicle body. Therefore, the magnetic strap hook has the advantage of stability of attraction.

2. Since the magnetic strap hook is provided with the slide cavity in the hook body, the magnet is capable of retracting into the slide cavity when the magnetic strap hook is not in use, thereby forming protection for the magnet, so that the magnet is capable of maintaining stable attraction efficiency.

DETAILED DESCRIPTION OF THE INVENTION

The technical solutions of the present invention are further described below with reference to the specific embodiments of the present invention in conjunction with the accompanied drawings, but the present invention is not limited to the embodiments.

Embodiment 1

Figure 1:
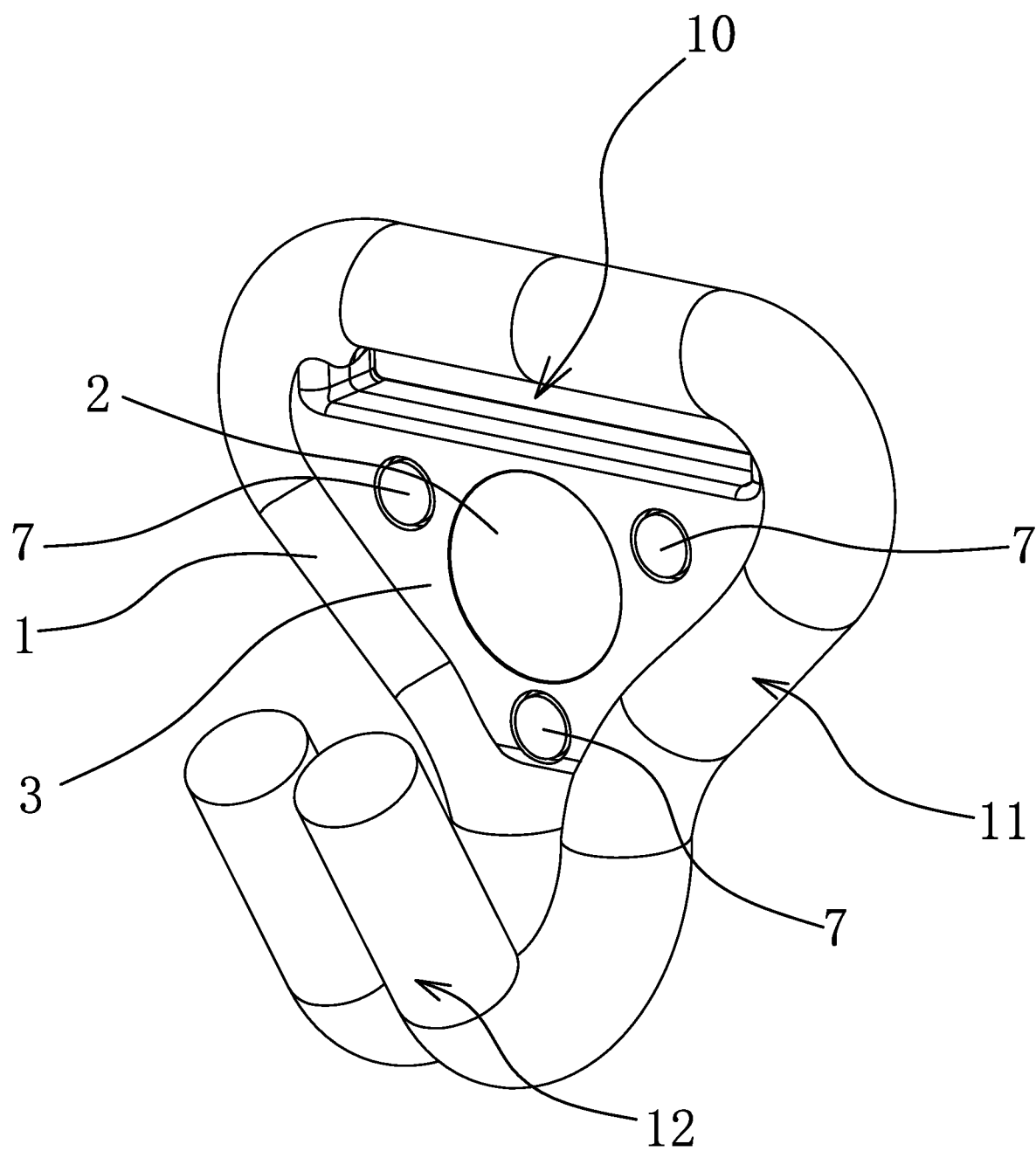
FIG. 1 is a first perspective view of a magnetic strap hook according to a first embodiment of the present invention.
Figure 2:
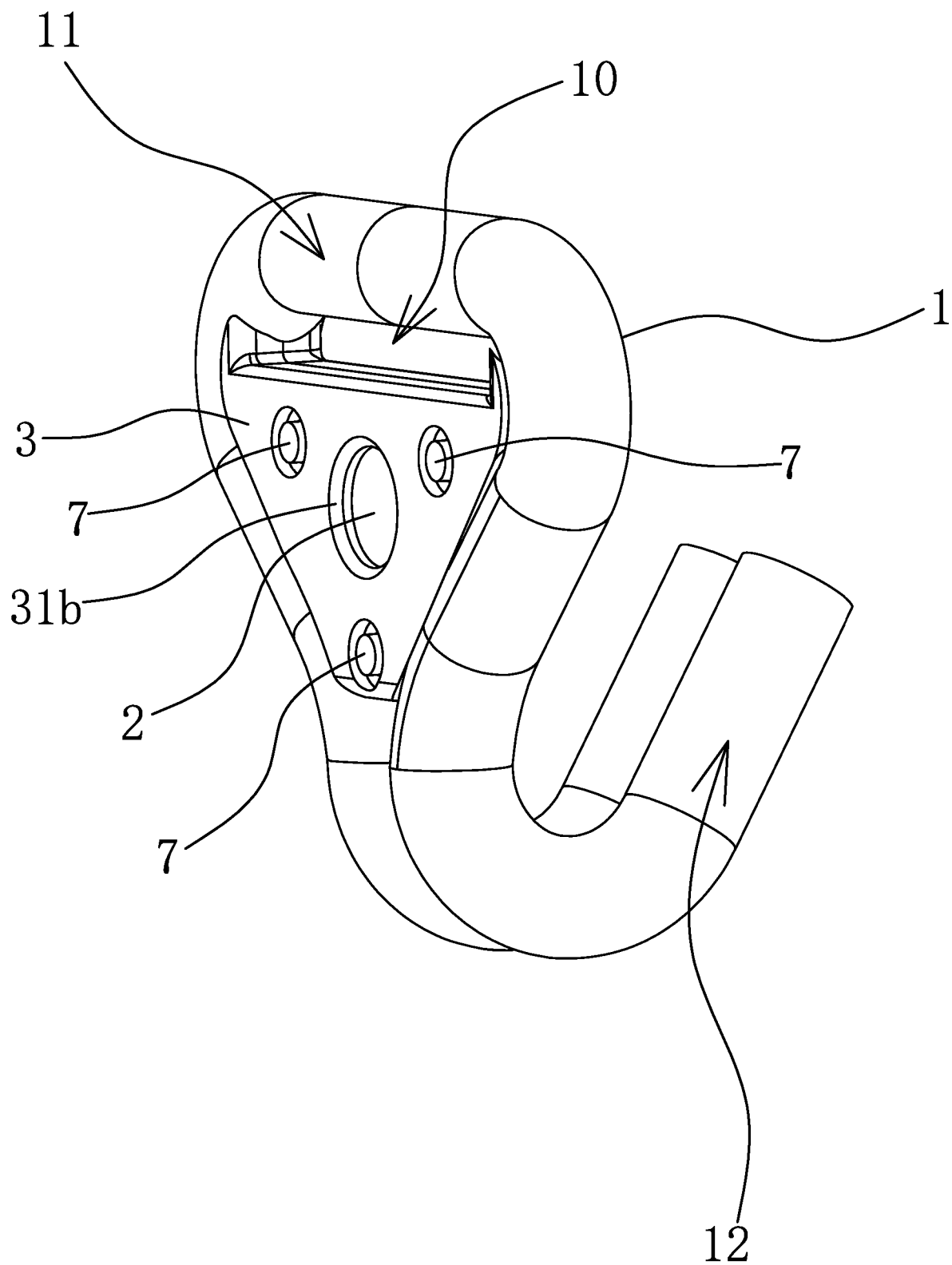
FIG. 2 is a second perspective view of the magnetic strap hook according to the first embodiment of the present invention.

One embodiment of a magnetic strap hook of the present invention is mainly used for binders. As shown in FIGS. 1 and 2, the magnetic strap hook comprises a hook body 1, a magnet holder 3 fixed on the hook body 1, and a magnet 2 connected on the magnet holder 3. The magnet holder 3 is made of a material that cannot be attracted by the magnet 2; preferably, the material is a plastic. The hook body 1 is formed by bending a metal strip, a middle portion of the metal strip is coplanarly bent to form a triangular connector portion 11, end portions at two ends of the metal strip are adjoined side by side and bent toward a front side of the connector portion 11 to form a hook portion 12, and the magnet holder 3 is fixedly disposed inside the connector portion 11. A strap hole 10 through which a binding strap 8 passes through is disposed between a top of the magnet holder 3 and the metal strip.

Figure 3:
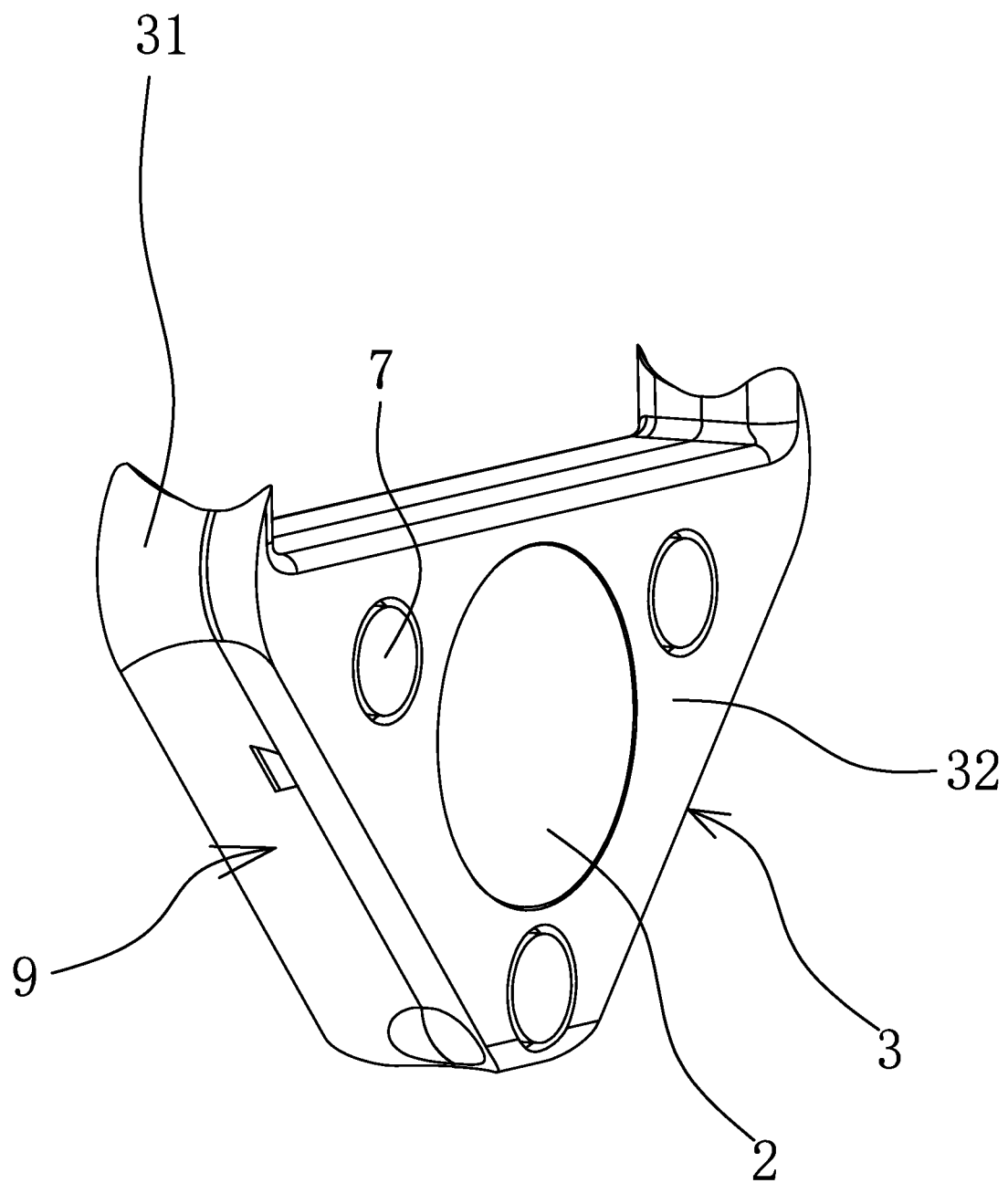
FIG. 3 is a perspective view of the first embodiment of the magnetic strap hook after a hook body is omitted.

As shown in FIG. 3, one embodiment of the magnet holder 3 comprises a rear cover 31 and a front cover 32 each having a triangular shape. After the rear cover 31 and the front cover 32 match and cover each other, left and right oblique sides of the magnet holder 3 are respectively formed with an arc-shaped positioning groove 9 with an opening facing outwardly, and the positioning grooves 9 on the left and right oblique sides of the magnet holder 3 are respectively engaged on inner side walls of the metal strip at left and right sides of the connector portion 11. An outer side of the magnet holder 3 provided with an opening 32b and opposite to a front side of the metal strip at the connector portion 11 of the hook body 1 is recessed inward, and the rear cover 31 and the front cover 32 are fixed by rivets 7. Since the magnet holder 3 is made of a plastic material, the positioning structure can be used to stably fix the magnet holder 3 on the hook body 1, and the outer side of the magnet holder 3 provided with the opening 32b and opposite to the metal strip at the connector portion 11 of the hook body 1 is recessed inward. In this way, the magnet holder 3 does not contact with a vehicle body during the binding process, the magnet holder 3 can be prevented from being damaged and deformed, and the stability of the attraction member magnet 2 sliding or tilting in a slide cavity 4 can be ensured.

Figure 4:
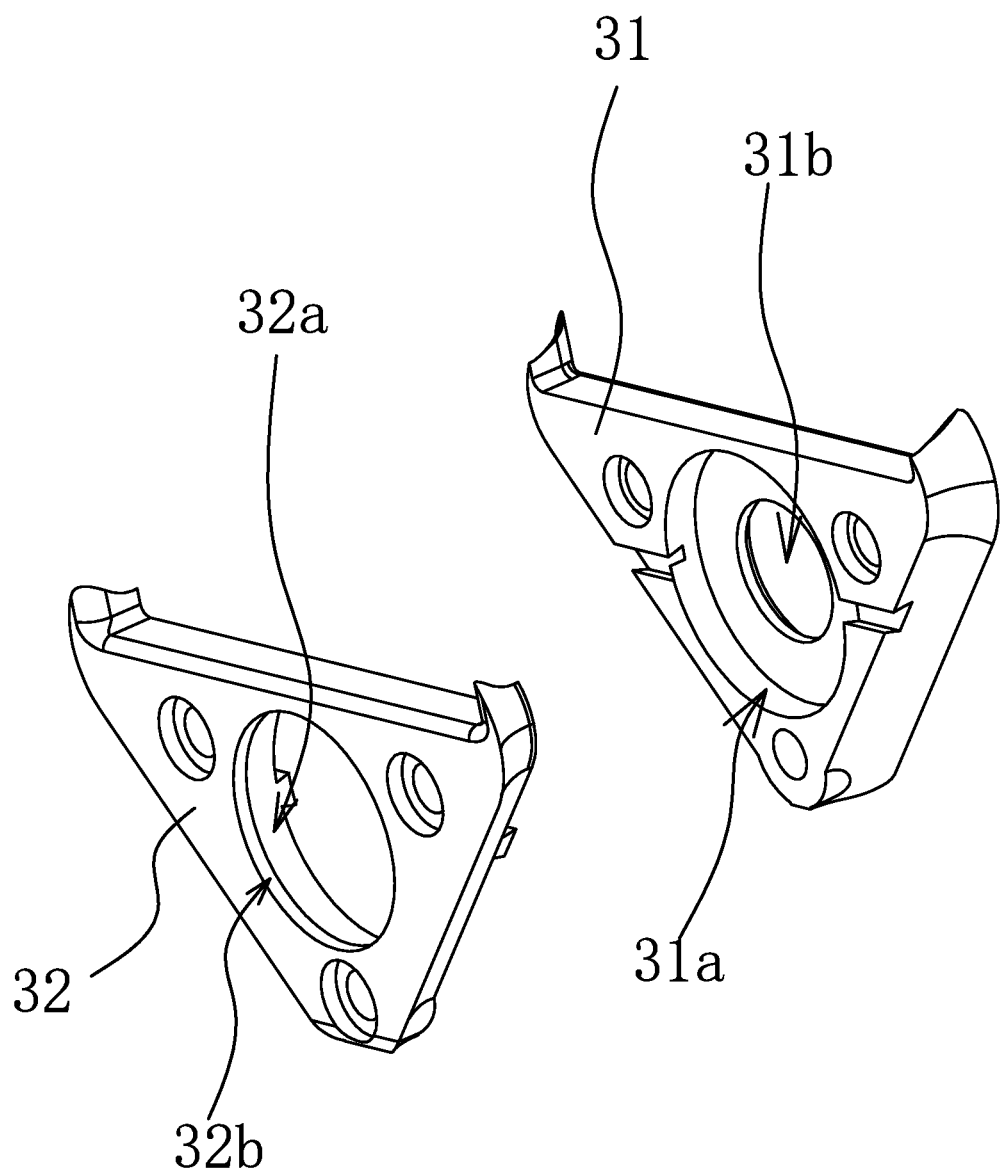
FIG. 4 is an exploded view of a magnet holder in the first embodiment of the magnetic strap hook.

As shown in FIG. 4, one embodiment of the rear cover 31 has a first circular cavity 31a, the front cover 32 is provided with a second circular cavity 32a, and a diameter of the first circular cavity 31a is the same as a diameter of the second circular cavity 32a. The rear cover 31 and the front cover 32 match and cover each other, and the first circular cavity 31a and the second circular cavity 32a are opposite to each other to form the slide cavity 4. A press hole 31b is provided on a bottom wall of the first circular cavity 31a, and the opening 32b is provided on a bottom wall of the second circular cavity 32a. The rear cover 31 and the front cover 32 are connected by rivets 7, such disposition is convenient for installation, and is convenient for mass production.

Figure 5:
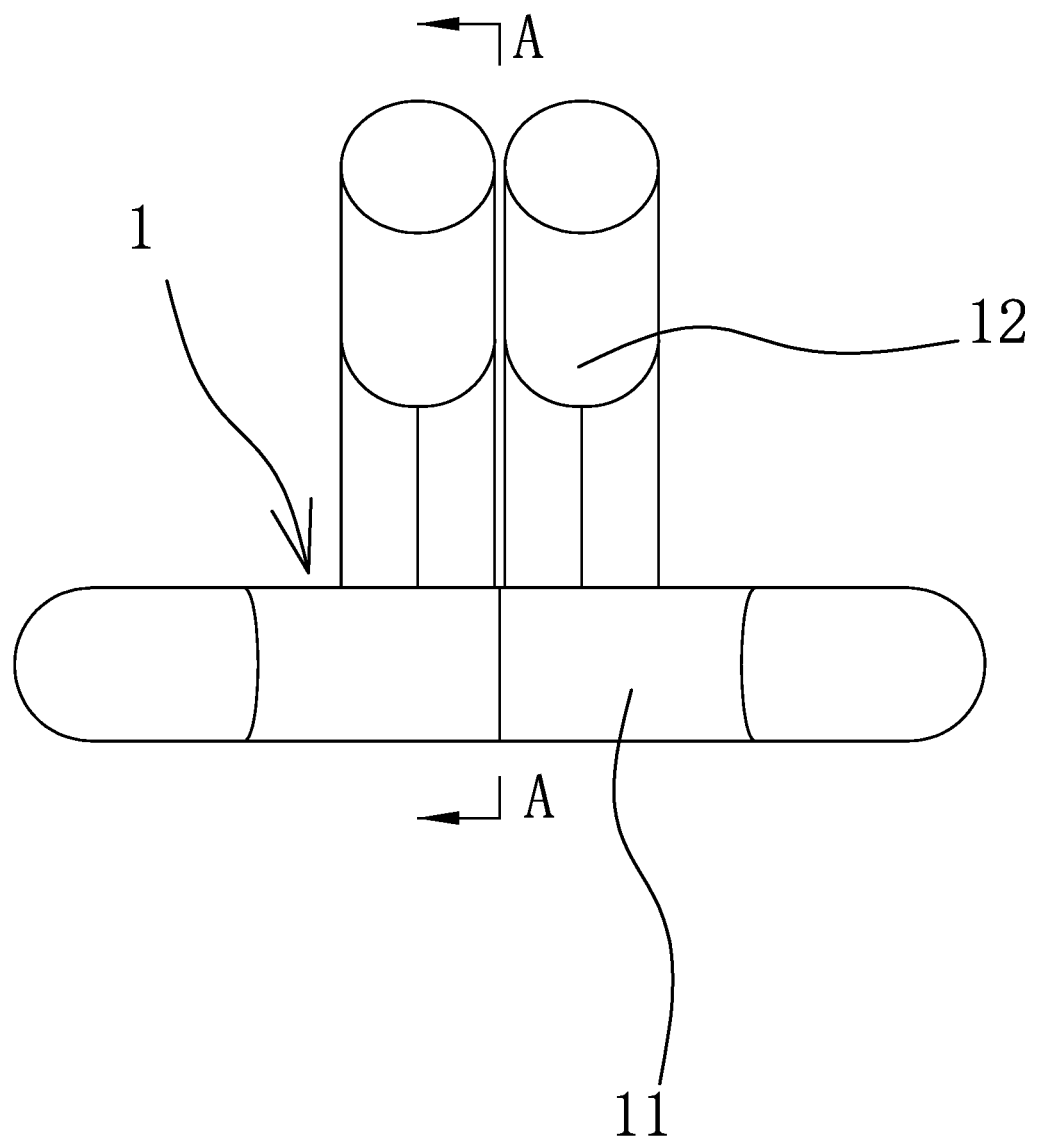
FIG. 5 is a top view of the first embodiment of the magnetic strap hook.
Figure 6:
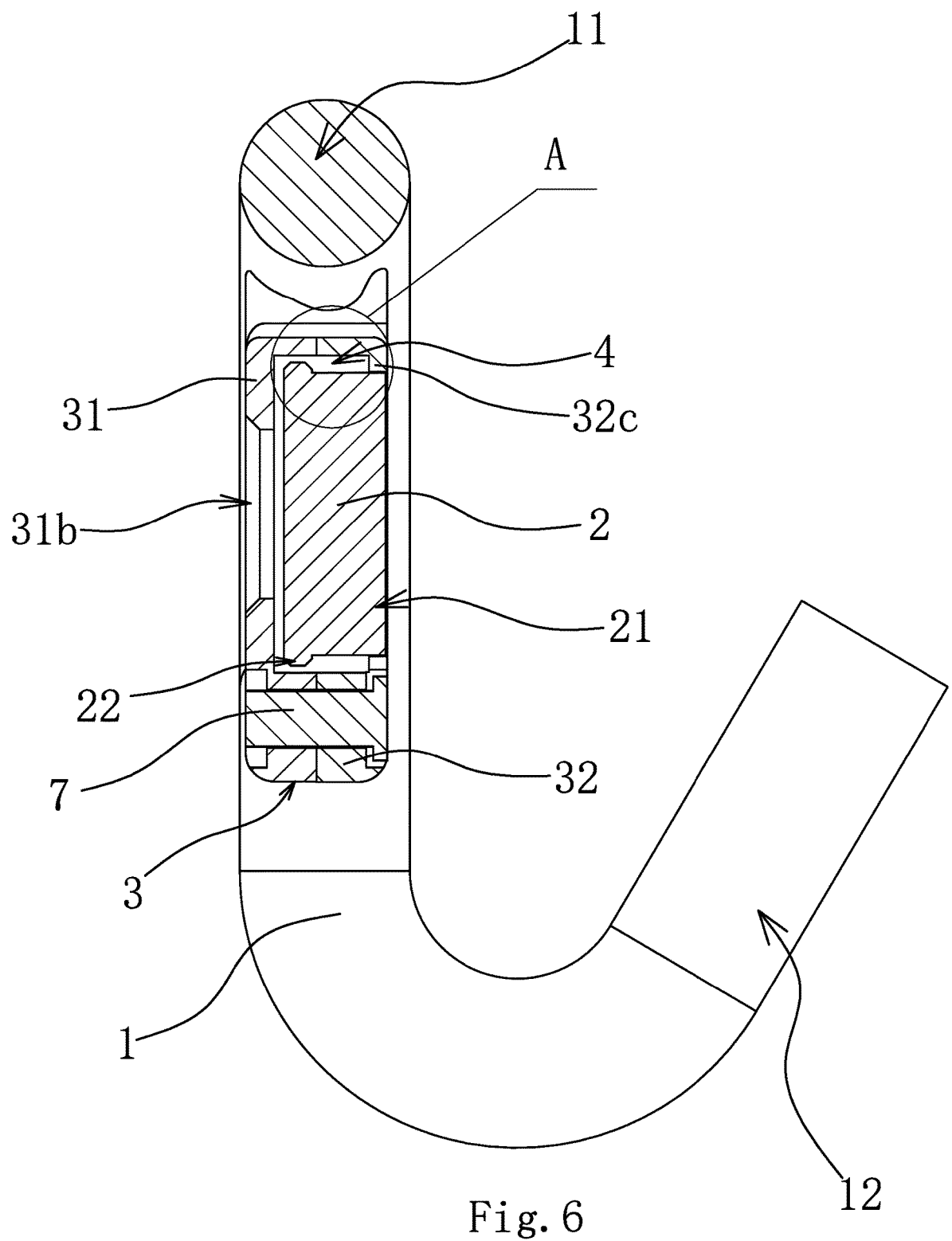
FIG. 6 is a cross-sectional view of A-A in FIG. 5.

As shown in FIG. 5 and FIG. 6, one embodiment of the slide cavity 4 is disposed on the magnet holder 3, the slide cavity 4 has a circular cross section, and the magnet 2 is slidably disposed or tilted in the slide cavity 4 along front and rear directions of the hook body 1. The opening 32b is disposed on a front side of the magnet holder 3, and the opening 32b is a circular opening. A rear side of the magnet holder 3 is provided with the press hole 31b communicating with the slide cavity 4. By disposing the press hole 31b, the magnet 2 can be assisted manually to extend outward and attracted by the vehicle body, which makes the operation more convenient. The magnet 2 comprises a main body 21 in a circular block shape, an outer peripheral wall of the main body 21 has a protruded guiding rim 22, the guiding rim 22 is slidably connected in the slide cavity 4, and a gap is between a side wall of the slide cavity 4 and the guiding rim 22. A diameter of the main body 21 is smaller than a diameter of the opening 32b by 2 mm. The diameter of the opening 32b is larger than a diameter of the magnet 2 causing the magnet 2 capable of swinging to a certain extent in the opening 32b to improve the stability of attraction of the strap hook. The diameter of the magnet 2 being smaller than the diameter of the opening 32b by 2 mm, which not only ensures that the swing extent satisfies the requirement for stability of attraction, but also blocks external metal impurities from entering the slide cavity 4 through the gap. The external metal impurities are only attracted by an outer end surface of the magnet 2 which is easy to clean, so that the cleanness in the slide cavity 4 can be ensured, and stably sliding and swinging of the magnet 2 can also be ensured, thereby ensuring the stability of attraction of the strap hook.

Figure 7:
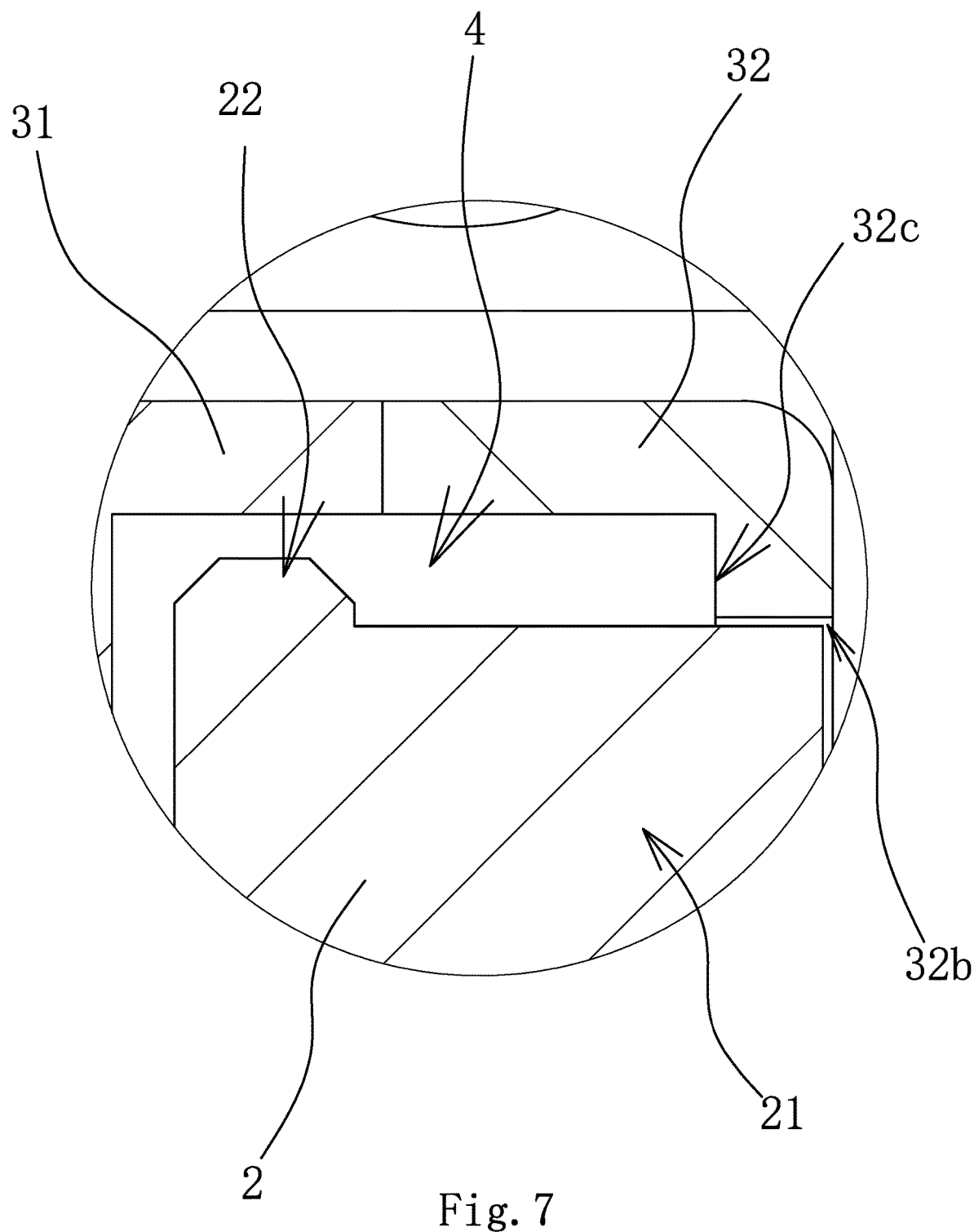
FIG. 7 is an enlarged view of portion A in FIG. 6.

As shown in FIG. 7, one embodiment of the main body 21 of the magnet 2 is located in the opening 32b, a gap is between an inner peripheral surface of the opening 32b and an outer peripheral surface of the main body 21, and the main body 21 of the magnet 2 is capable of extending outside the slide cavity 4 from the opening 32b. Since the main body 21 of the magnet 2 is located in the opening 32b, the magnet 2 does not interfere with the magnet holder 3, ensuring that the magnet 2 is capable of smoothly extending and retracting each time. At the same time, the gap between the inner peripheral surface of the opening 32b and the outer peripheral surface of the main body 21 of the magnet 2 ensures that the magnet 2 is also capable of swinging to a certain extent relative to the opening 32b. The guiding rim 22 is annular and is disposed along a circumferential direction of the main body 21, and the gap between the side wall of the slide cavity 4 and the guiding rim 22 is larger than a gap between the inner peripheral surface of the opening 32b and the main body 21.

As shown in FIG. 7, a limit structure is disposed on one embodiment of the magnet holder 3, and the limit structure is capable of limiting the distance the magnet 2 can slide outward from the slide cavity 4. The limit structure comprises an annular flange 32c located on a side wall of an outer end of the second circular cavity 32a, and the guiding rim 22 is capable of butting against an inner end surface of the annular flange 32c. By disposing the annular flange 32c, the magnet 2 can be prevented from sliding completely outside of the slide cavity 4, and, at the same time, during usage, although the magnet 2 is stably attracted by the vehicle body, the hook body 1 can be prevented from moving to a large extent to cause unhooking.

Figure 8:
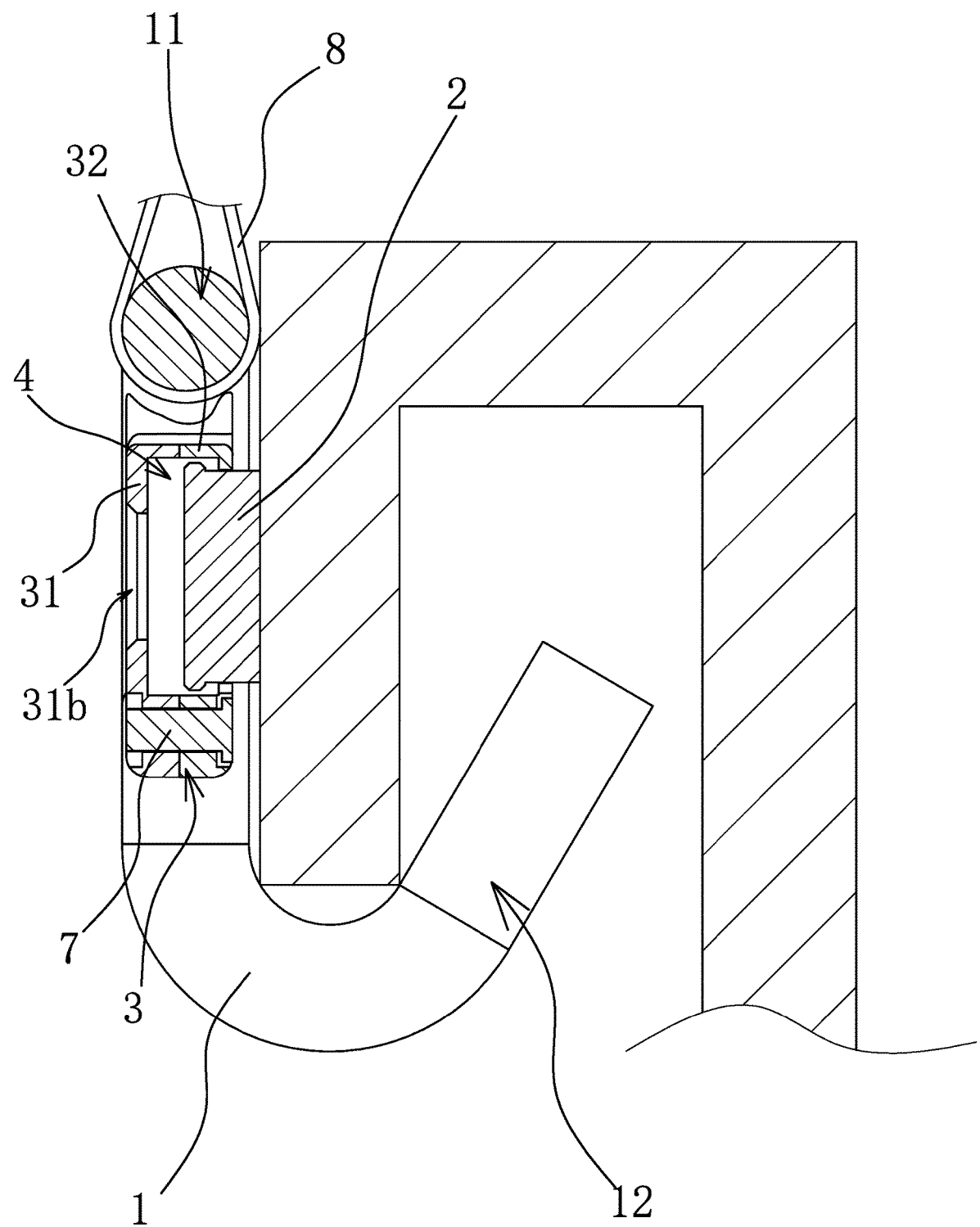
FIG. 8 is a schematic view of the first embodiment of the magnetic strap hook in use.

As shown in FIG. 8, when using the magnetic strap hook, one embodiment of the strap hook is hook-connected on the vehicle body, and when the magnet 2 approaches the vehicle body, the magnet 2 is capable of automatically extending outside the slide cavity 4 and attracting the vehicle body under the action of the attraction force and thus fix the magnetic strap hook. Since the magnet 2 is slidably disposed in the slide cavity 4, and a gap is between the side wall of the slide cavity 4 and the magnet 2, the magnet 2 on the magnet holder 3 is capable of moving back and forth relative to the hook body 1 and swinging along the front and rear directions of the hook body 1. With such a structural design, the hook body 1 of the strap hook is movable relative to the magnet 2 when the magnet 2 is attracted by the vehicle body. Therefore, when the binding strap 8 swings, back and forth movement or swinging of the hook body 1 relative to the magnet 2 can greatly reduce the influence of swinging of the binding strap 8 on the attraction efficiency of the magnet 2, and keep the magnet 2 stationary while the binding strap 8 and the hook body 1 swing, thereby more effectively avoiding the phenomenon of the magnet 2 being tilted, so that the magnet 2 can be more effectively attracted by the vehicle body 1, and the stability of attraction of the strap hook is improved. In addition, with clearance fit between the side wall of the slide cavity 4 and the magnet 2, a large extent of swing of the hook body 1 relative to the magnet 2 can be avoided. The limit structure is capable of limiting the distance the magnet 2 can slide outward from the slide cavity 4, thereby preventing a large extent of extending and retracting motion of the hook body 1 relative to the magnet 2, and preventing the hook body 1 from swinging excessively to cause unhooking under the premise of ensured stable attraction of the magnet 2.

Embodiment 2

The structures and principles of this embodiment are basically the same as those of the first embodiment, and the difference is that the diameter of the main body 21 of the magnet 2 is smaller than the diameter of the opening 32b by 3 mm.

Embodiment 3

The structures and principles of this embodiment are basically the same as those of the first embodiment, and the difference is that the diameter of the main body 21 of the magnet 2 is smaller than the diameter of the opening 32b by 1 mm.

Embodiment 4

Figure 9:
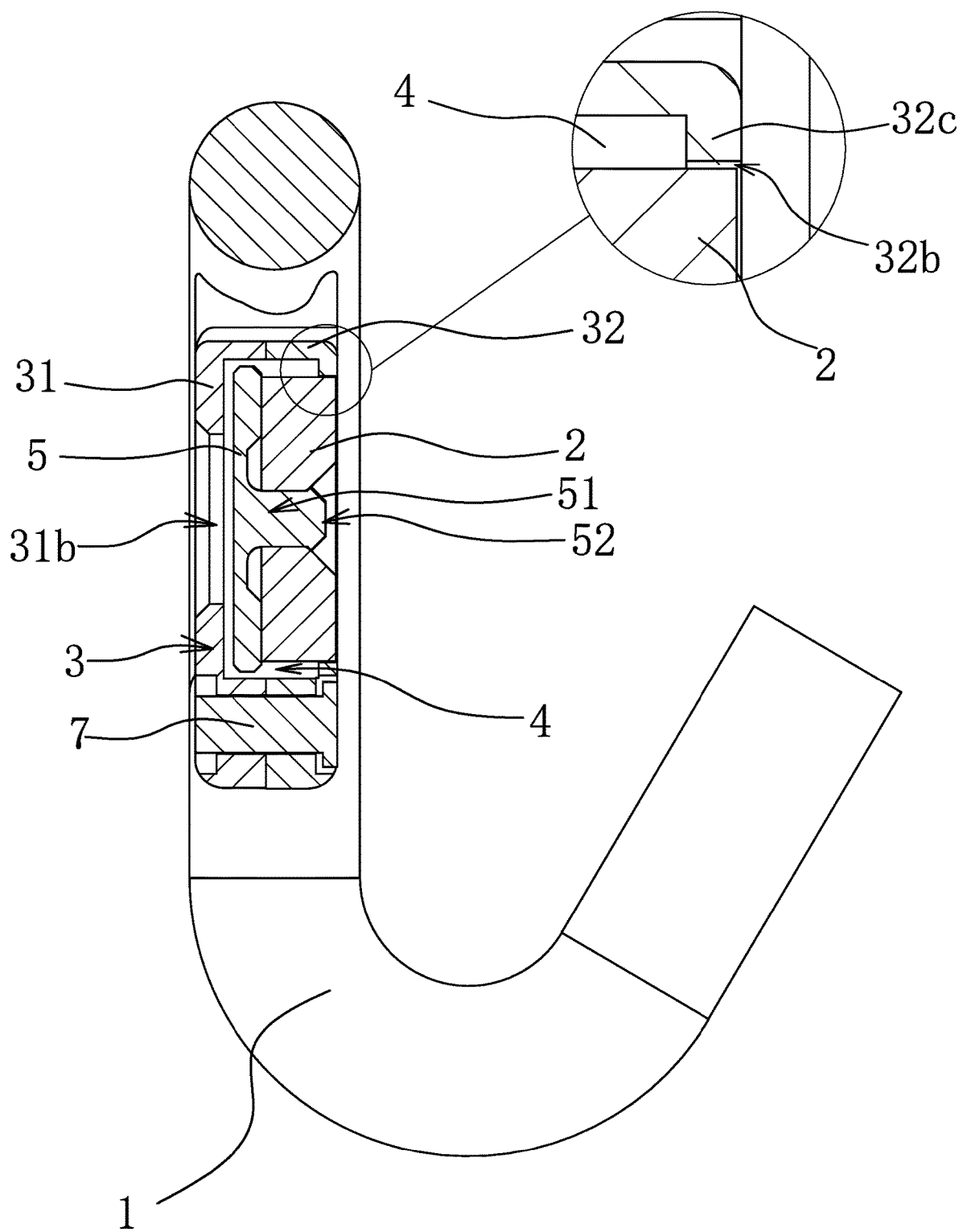
FIG. 9 is a cross-sectional view of a fourth embodiment of the magnetic strap hook.
Figure 10:
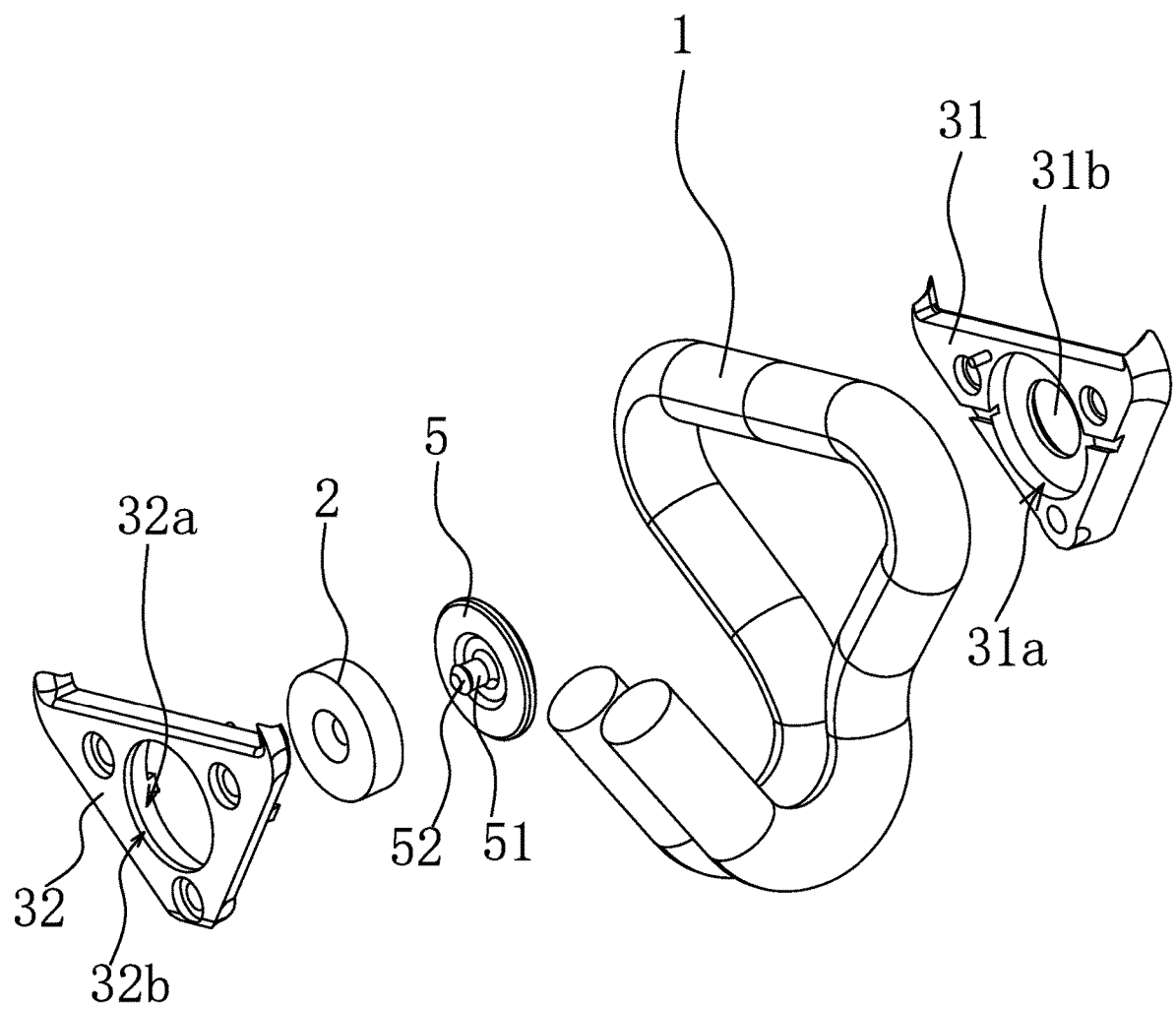
FIG. 10 is an exploded view of the fourth embodiment of the magnetic strap hook.

The structures and principles of this embodiment are basically the same as those of the first embodiment. The differences are that, as shown in FIG. 9 and FIG. 10, inside the slide cavity 4 is further disposed with a slide plate 5, the slide plate 5 has a circular plate shape, and a diameter of the slide cavity 4 is larger than a diameter of the slide plate 5. The slide cavity 4 and the slide plate 5 are circular, so that the hook body 1 is also capable of rotating relative to the magnet 2, thereby reducing the influence on the attraction efficiency of the magnet 2 when the hook body 1 rotates, and improving the stability of attraction efficiency of the magnet 2. One side of the slide plate 5 is opposite to the press hole 31b, the magnet 2 is located on another side of the slide plate 5 and is connected to the slide plate 5. Specifically, a middle portion of the sliding piece 5 has a pin 51, and a middle portion of the magnet 2 is provided with a connect hole. The pin 51 passes through the connect hole, and an end portion of the pin 51 has a radially and outwardly protruded rivet head 52 capable of preventing the magnet 2 from coming off the pin 51. A gap is between an outer peripheral surface of the slide plate 5 and the side wall of the slide cavity 4. The gap between the outer peripheral surface of the slide plate 5 and the side wall of the slide cavity 4 ensures that the slide plate 5 and the magnet 2 are capable of swinging to a certain extent in the slide cavity 4, thereby improving the stability of attraction of the strap hook. By disposing the slide plate 5 between the press hole 31b and the magnet 2, on one hand, the slide plate 5 can provide guiding effect to cause the magnet 2 to extend and retract stably. On the other hand, since there is a large amount of metal impurities in the environment where the magnetic strap hook is being used, and the magnet 2 is magnetic, the magnetism of the magnet 2 is blocked by disposing the slide plate 5, so that the magnet 2 does not actively attract the external metal impurities into the slide cavity 4, ensuring the slide plate 5 capable of sliding and swinging stably in the slide cavity 4.

As shown in FIG. 9, the limit structure comprises the annular flange 32c located on the side wall of the outer end of the second circular cavity 32a, and an edge of the slide plate 5 is capable of butting against an inner end surface of the annular flange 32c. By disposing the annular flange 32c, the magnet 2 can be prevented from sliding completely outside of the slide cavity 4, and, at the same time, during usage, although the magnet 2 is stably attracted by the vehicle body, the hook body 1 can be prevented from moving to a large extent to cause unhooking.

Embodiment 5

Figure 11:
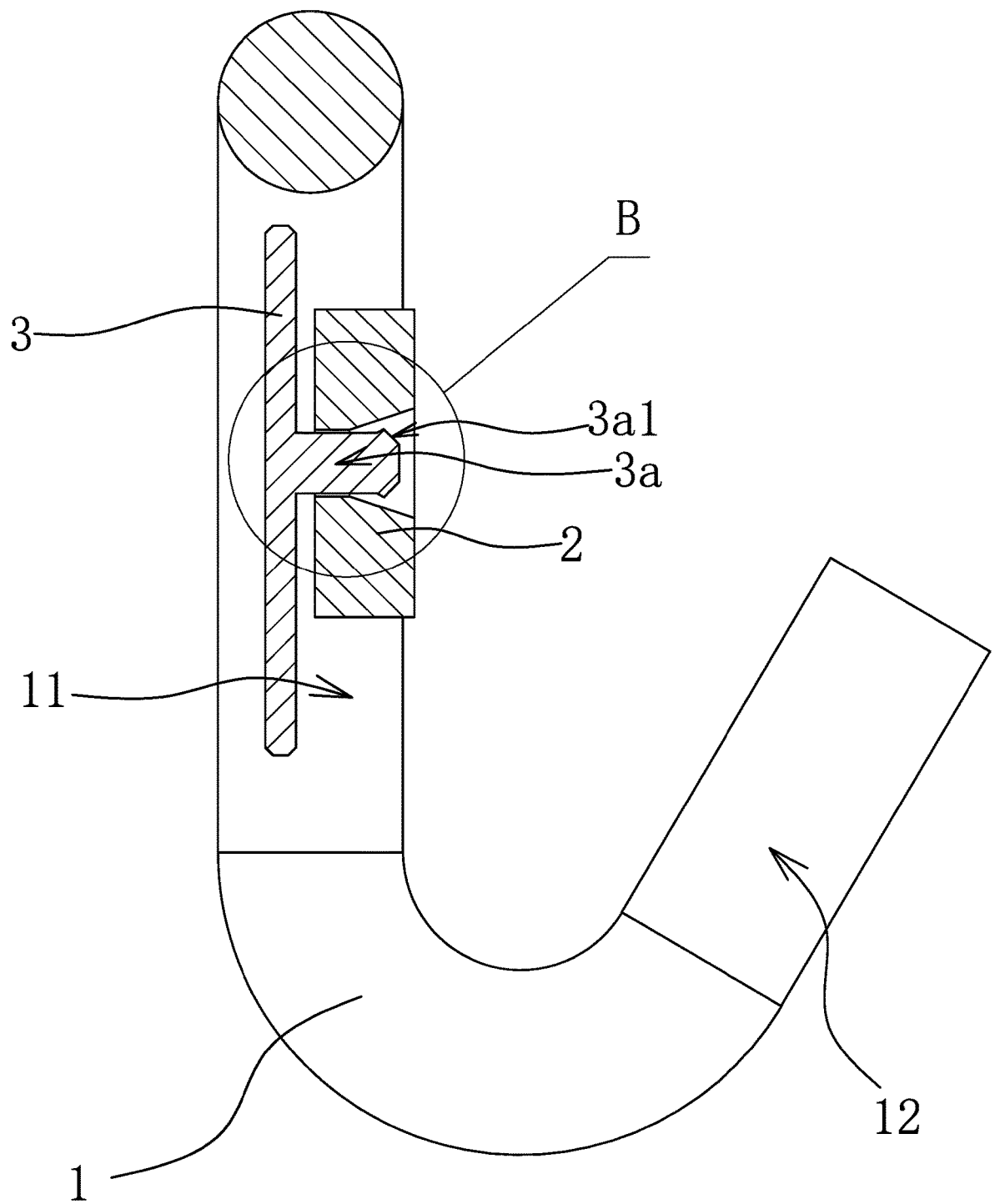
FIG. 11 is a cross-sectional view of a fifth embodiment of the magnetic strap hook.
Figure 12:
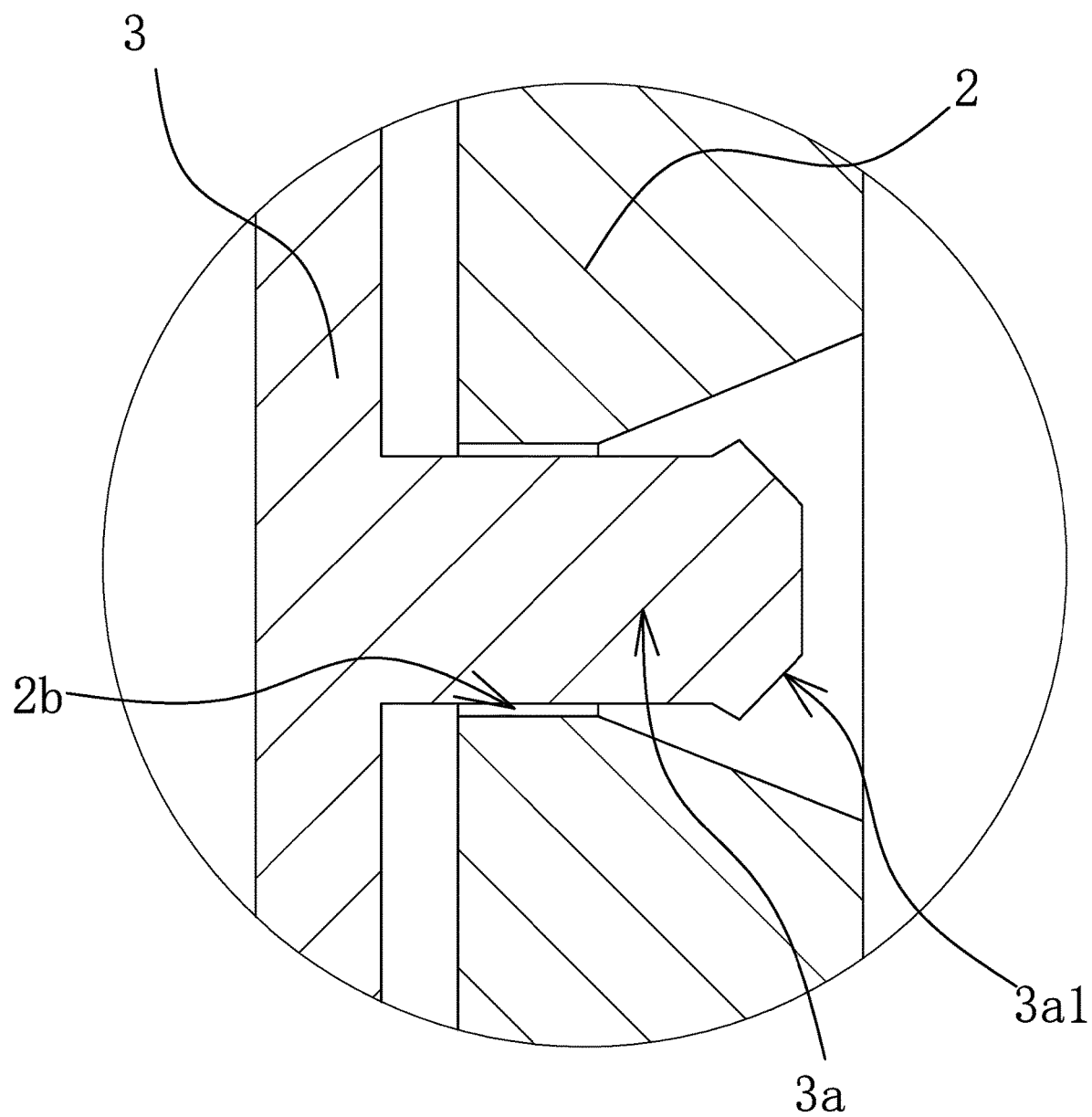
FIG. 12 is an enlarged view of portion B in FIG. 11, showing a magnet in a level position.
Figure 16:
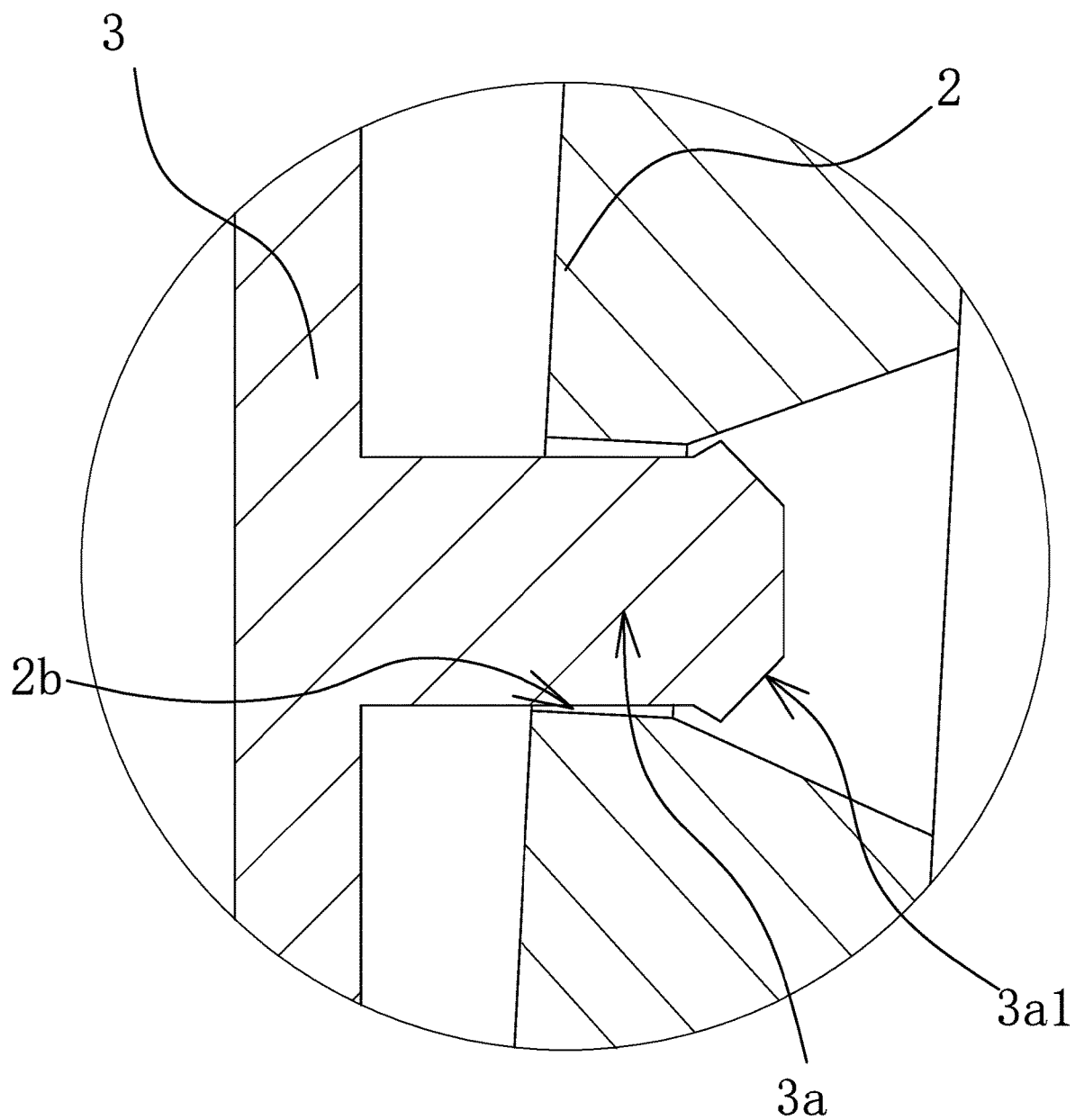
FIG. 16 is an enlarged view of portion B in FIG. 11, showing a magnet in a tilted position.

The structures and the principles of this embodiment are basically the same as those of the first embodiment. The differences are that, as shown in FIG. 11, FIG. 12, and FIG. 16, the magnet holder 3 has an extension rod 3a having a cylindrical shape and extending along the front and rear directions of the hook body 1. The middle portion of the magnet 2 is provided with a slide hole 2b, and the magnet 2 is slidably sleeved on the extension rod 3a through the slide hole 2b. A front end of the extension rod 3a has a bulge head 3a1 capable of preventing the magnet 2 from detaching the extension rod 3a, and a diameter of the slide hole 2b is greater than or equal to a diameter of the extension rod 3a. An end surface of a front end of the magnet 2 is an attraction surface, and through sliding of the magnet 2 the attraction surface is capable of sliding to reach a front side of the bulge head 3a1. When the diameter of the slide hole 2b is larger than the diameter of the extension rod 3a, the magnet 2 is capable of sliding back and forth on the extension rod 3a, and is also capable of realizing swinging. When the diameter of the slide hole 2b is equal to the diameter of the extension rod 3a, the magnet 2 is capable of sliding back and forth on the extension rod 3a, so when the binding strap 8 swings, the hook body 1 swings and moves back and forth relative to the magnet 2 to cause the magnet 2 capable of being more effectively attracted by the vehicle body.

Embodiment 6

Figure 13:
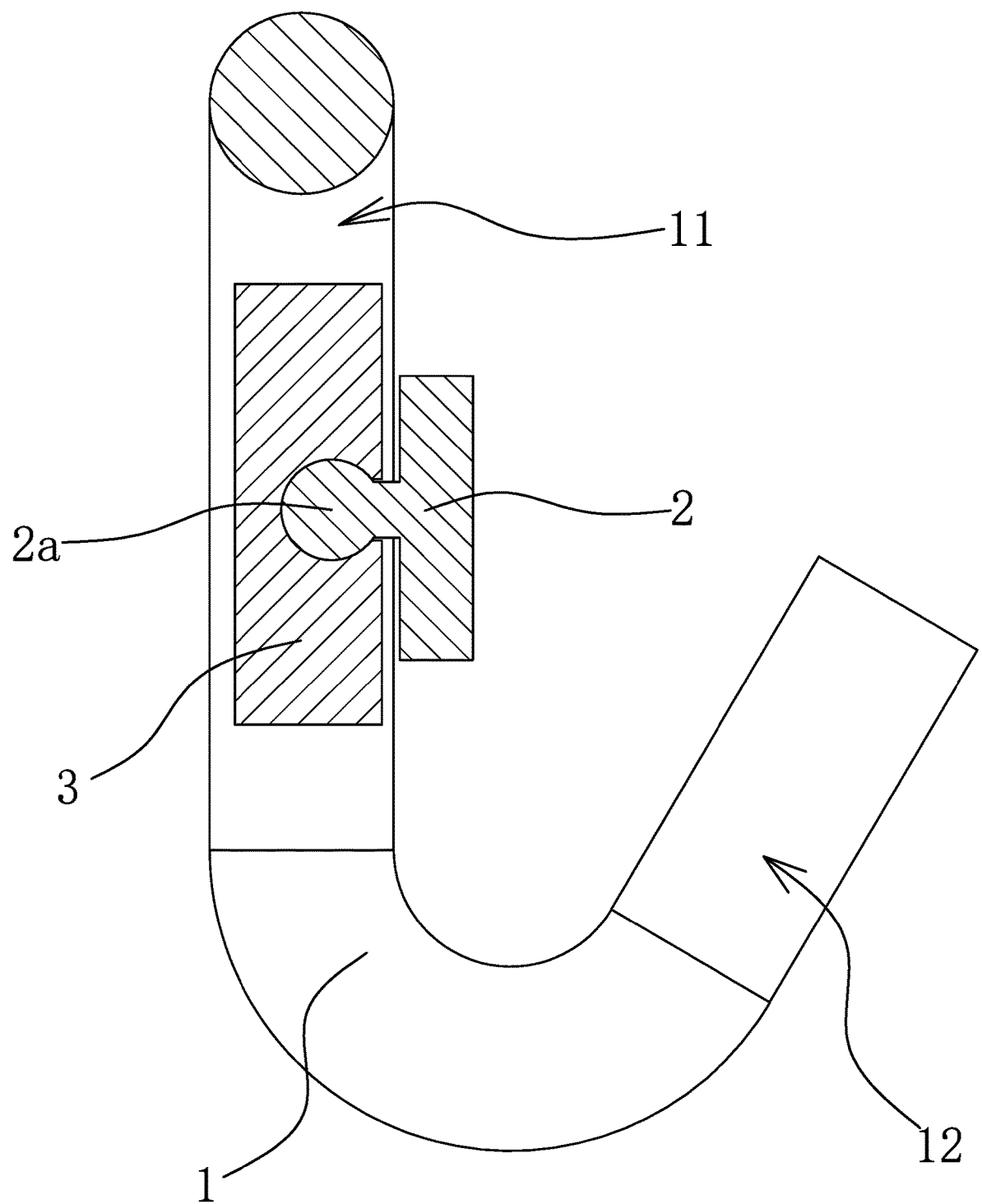
FIG. 13 is a cross-sectional view of a sixth embodiment of the magnetic strap hook.

The structures and principles of this embodiment are basically the same as those of the first embodiment. The difference is that the magnet 2 is hingedly connected on the magnet holder 3. Specifically, as shown in FIG. 13, the magnet 2 has a spherical hinge joint 2a, the magnet holder 3 has a spherical groove, and the hinge joint 2a is located in the spherical groove. Through such a design, the magnet 2 is capable of swinging relative to the hook body 1, and when the binding strap 8 swings, the magnet 2 is capable of being more effectively attracted by the vehicle body.

Embodiment 7

Figure 14:
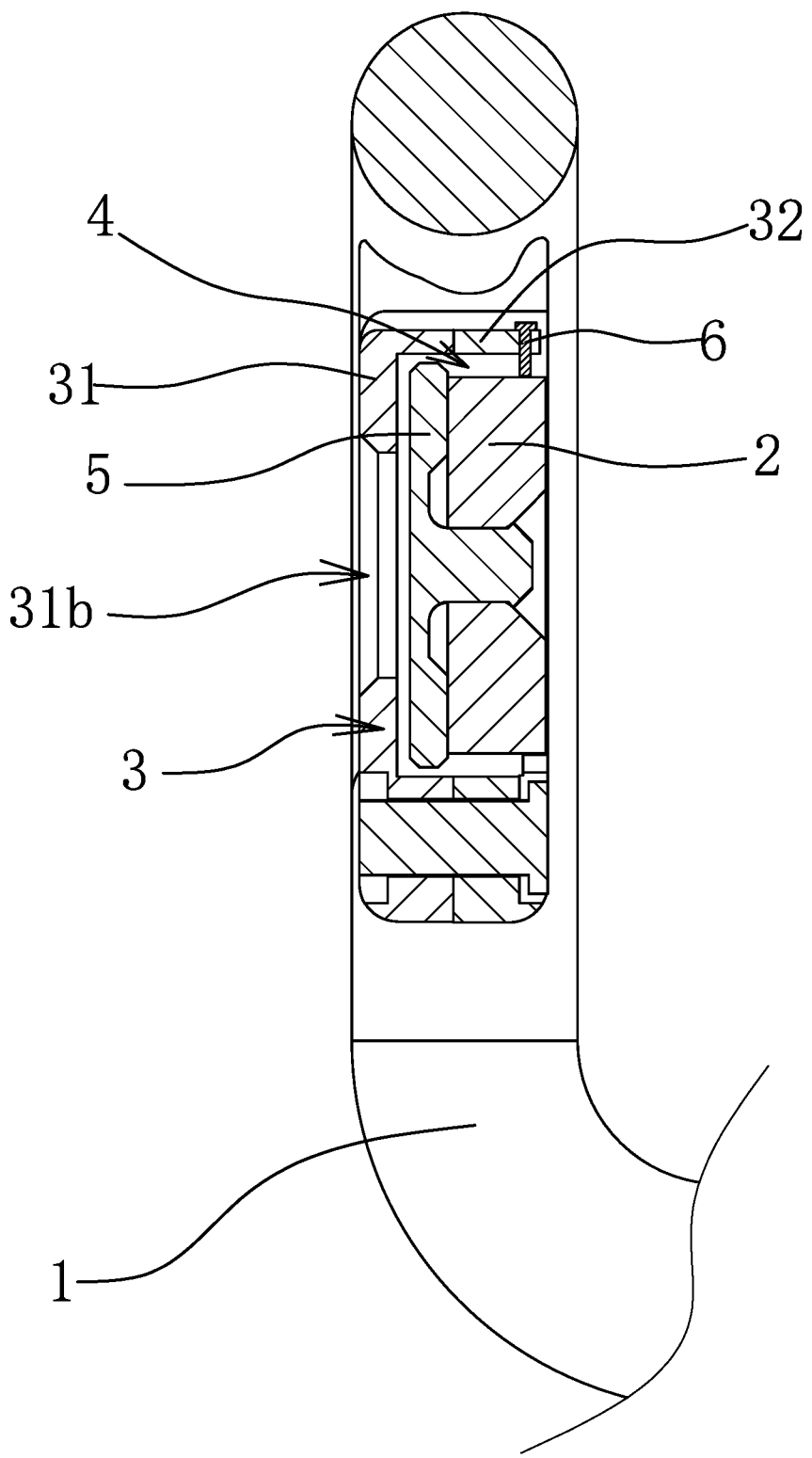
FIG. 14 is a cross-sectional view of a seventh embodiment of the magnetic strap hook.

The structures and principles of this embodiment are basically the same as those of the first embodiment. The differences are that, as shown in FIG. 14, the limit structure comprises a bolt 6 threadedly connected on the magnet holder 3, an inner end of the bolt 6 extends into the slide cavity 4, a gap is between an end portion of the bolt 6 and the magnet 2, and the edge of the slide plate 5 is capable of butting against the bolt 6 after the slide plate 5 moves outwardly.

Embodiment 8

Figure 15:
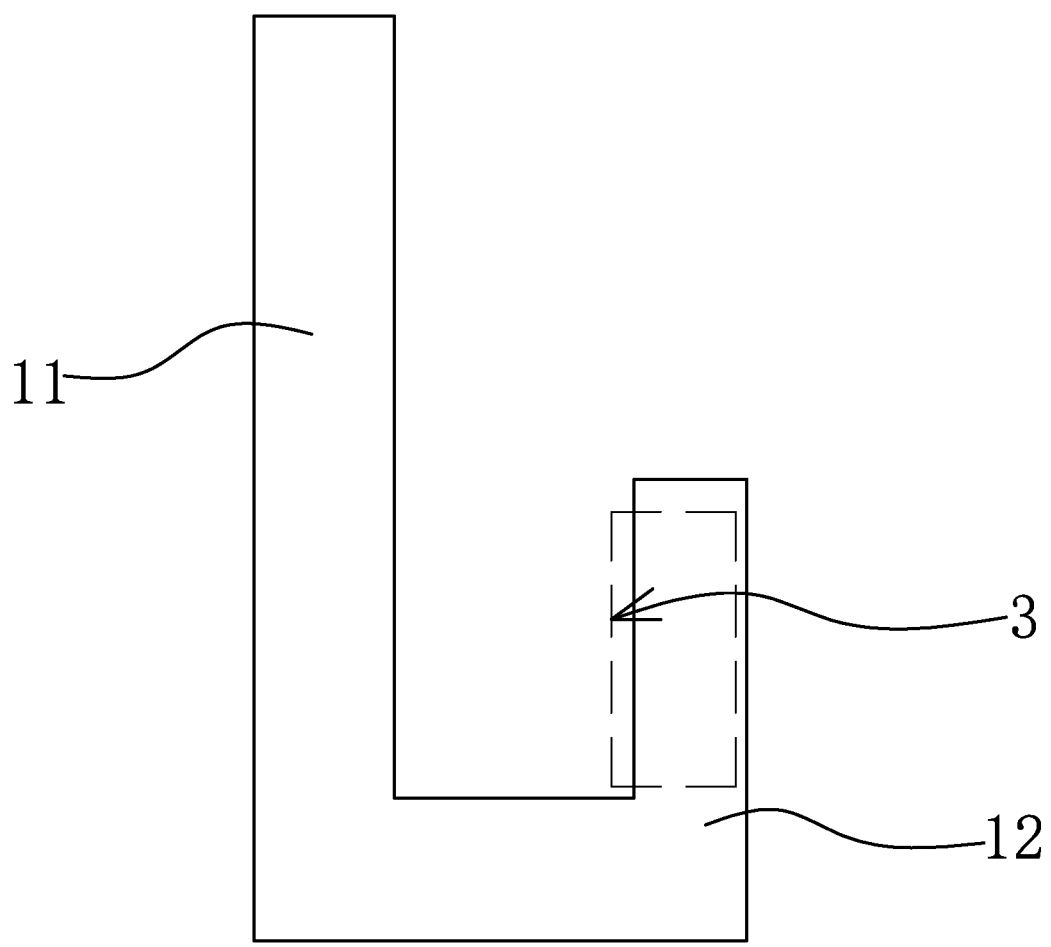
FIG. 15 is a simplified schematic view of an eighth embodiment of the magnetic strap hook.

The structures and principles of this embodiment are basically the same as those of the first embodiment. The difference is that, as shown in FIG. 15, the magnet holder 3 is disposed on the hook portion 12 of the hook body 1.

The specific embodiments described herein are merely illustrative of the spirit of the present invention. Technical personnel skilled in the art to which the present invention pertains can make various modifications or additions to the specific embodiments described or replace them in a similar manner, without departing from the spirit of the present invention or beyond the scope defined by the appended claims.

Although the technical terms hook body 1, connector portion 11, hook portion 12, magnet 2, main body 21, guiding rim 22, hinge joint 2a, slide hole 2b, magnet holder 3, rear cover 31, first circular cavity 31a, press hole 31b, front cover 32, second circular cavity 32a, opening 32b, annular flange 32c, extension rod 3a, bulge head 3a1, slide cavity 4, slide plate 5, pin 51, rivet head 52, bolt 6, rivet 7, binding strap 8, positioning groove 9, strap hole 10 are used more frequently herein, the possibility of using other technical terms is not excluded. These technical terms are merely used to describe and explain the nature of the present invention more conveniently; construing them as any additional limitation is contrary to the spirit of the present invention.

LIST OF REFERENCED PARTS 1 hook body
11 connector portion
12 hook portion
2 magnet
21 main body 22 guiding rim
2a hinge joint
2b slide hole
3 magnet holder
31 rear cover
31a first circular cavity
31b press hole
32 front cover
32a second circular cavity
32b opening
32c annular flange
3a extension rod
3a1 bulge head
4 slide cavity
5 slide plate
51 pin
52 rivet head
6 bolt
7 rivet
8 binding strap
9 positioning groove
10 strap hole

What is claimed is:

1. A magnetic strap hook comprising:
a hook body comprising a connector portion and a hook portion, the hook portion connected to the connector portion, the hook portion being located at a front side of the connector portion;
a magnet holder fixed on the hook body; and
a magnet connected on the magnet holder;
wherein the magnet on the magnet holder is capable of moving back and forth relative to the hook body, or is capable of swinging along front and rear directions of the hook body, or is capable of moving and swinging along front and rear directions of the hook body; and
wherein the magnet is capable of extending outside the magnet holder, and a limit structure capable of limiting the sliding distance of the magnet is disposed on the magnet holder.

2. The magnetic strap hook as claimed in claim 1, wherein a slide cavity is disposed on the magnet holder, the magnet is slidably disposed in the slide cavity along the front and rear directions of the hook body, the magnet is capable of extending outside the slide cavity, a first gap is between a side wall of the slide cavity and the magnet, and the limit structure is capable of limiting the distance the magnet can slide outward from the slide cavity.

3. The magnetic strap hook as claimed in claim 2, wherein an opening is disposed on a front side of the magnet holder, the magnet is located in the opening, and a second gap is between an inner peripheral surface of the opening and an outer peripheral surface of the magnet.

4. The magnetic strap hook as claimed in claim 3, wherein a rear side of the magnet holder is provided with a press hole communicating with the slide cavity.

5. The magnetic strap hook as claimed in claim 4, wherein the magnet comprises a main body in a circular block shape and located in the opening, an outer peripheral wall of the main body has a protruded guiding rim, and the guiding rim is slidably connected in the slide cavity and a third gap is between the side wall of the slide cavity and the guiding rim.

6. The magnetic strap hook as claimed in claim 5, wherein the slide cavity has a circular cross section, the opening is a circular opening, and a diameter of the main body is smaller than a diameter of the opening by 1 mm to 3 mm.

7. The magnetic strap hook as claimed in claim 4, wherein inside the slide cavity is further disposed with a slide plate, a first side of the slide plate is opposite to the press hole, the magnet is located on a second side of the slide plate and is connected to the slide plate, and a fourth gap is between an outer peripheral surface of the slide plate and the side wall of the slide cavity.

8. The magnetic strap hook as claimed in any one of claim 1, wherein the hook body is formed by bending a metal strip, a middle portion of the metal strip is coplanarly bent to form the triangular connector portion, end portions at two ends of the metal strip are adjoined side by side and bent to form the hook portion, and the magnet holder is fixedly disposed inside the connector portion.

9. The magnetic strap hook as claimed in claim 5, wherein the magnet holder comprises a rear cover and a front cover, the rear cover has a first circular cavity, the front cover is provided with a second circular cavity, a diameter of the first circular cavity is the same as a diameter of the second circular cavity, the rear cover and the front cover match and cover each other, and the first circular cavity and the second circular cavity are opposite to each other to form the slide cavity, the press hole is provided on a bottom wall of the first circular cavity, and the opening is provided on a bottom wall of the second circular cavity.

10. The magnetic strap hook as claimed in claim 5, wherein the guiding rim is annular and is disposed along a circumferential direction of the main body, and the third gap between the side wall of the slide cavity and the guiding rim is larger than a fifth gap between the inner peripheral surface of the opening and the main body.

11. The magnetic strap hook as claimed in claim 9, wherein the limit structure comprises an annular flange located on a side wall of an outer end of the second circular cavity, and the guiding rim is capable of butting against an inner end surface of the annular flange.

12. The magnetic strap hook as claimed in claim 1, wherein the magnet holder has an extension rod having a cylindrical shape and extending along the front and rear directions of the hook body, a middle portion of the magnet is provided with a slide hole, the magnet is slidably sleeved on the extension rod through the slide hole, the limit structure is a bulge head capable of preventing the magnet from detaching the extension rod and disposed at a front end of the extension rod, and a diameter of the slide hole is greater than or equal to a diameter of the extension rod.

* * * * *